United States Patent [19]

Lonnecker

[11] Patent Number: 5,280,846
[45] Date of Patent: Jan. 25, 1994

[54] LIQUID AND GRANULAR FLUID DISPENSER

[76] Inventor: Bruce R. Lonnecker, 1500 E. 5th Ave., Denver, Colo. 80218

[21] Appl. No.: 948,647

[22] Filed: Sep. 23, 1992

[51] Int. Cl.$^5$ .............................................. B67D 5/22
[52] U.S. Cl. ..................................... 222/41; 222/438; 222/442; 222/456
[58] Field of Search ................. 222/41, 42, 424, 424.5, 222/434, 435, 438, 442, 454, 456

[56] References Cited

U.S. PATENT DOCUMENTS

| | | | |
|---|---|---|---|
| 2,799,436 | 7/1957 | Bernhardt | 222/454 |
| 2,800,257 | 7/1957 | Nixon | 222/454 |
| 2,899,115 | 8/1959 | Matter | 222/438 X |
| 3,029,002 | 4/1962 | Gregoire | 222/307 |
| 3,235,143 | 2/1966 | Goodrich | 222/454 |
| 3,254,808 | 6/1966 | Malis et al. | 222/416 |
| 3,254,809 | 6/1966 | Breneman | 222/442 |
| 3,707,247 | 12/1972 | Guala | 222/454 X |
| 4,077,547 | 3/1978 | Donoghue | 222/207 |
| 4,614,285 | 9/1986 | Fudalla et al. | 222/454 |
| 4,690,313 | 9/1987 | Luine et al. | 222/454 |
| 4,807,785 | 2/1989 | Pritchett | 222/442 |
| 5,174,478 | 12/1992 | Reyman | 222/438 X |

FOREIGN PATENT DOCUMENTS

| | | | |
|---|---|---|---|
| 0001411 | 4/1979 | European Pat. Off. | 222/438 |
| 2156783 | 10/1985 | United Kingdom | 222/454 |

Primary Examiner—Andres Kashnikow
Assistant Examiner—Joseph A. Kaufman

[57] ABSTRACT

A device for dispensing pre-measured volumes of both liquid and granular fluids attaches to a standard container (44) and is provided with an internal measuring chamber (56). The volume of a measuring chamber (56) is adjusted when its floor (32) is moved vertically by turning a volume selection knob (72). Fluid fills the measuring chamber (56) and is measured as the device is tilted back and then returned to the vertical orientation. The measured fluid is dispensed out a chute (60) as the device is subsequently tilted forward.

8 Claims, 8 Drawing Sheets

LIQUID AND GRANULAR FLUID DISPENSER

BACKGROUND

1. Field of Invention

This invention relates to dispensers for fluids, specifically to a dispenser that measures and dispenses a preselectable volume of fluid from a standard reservoir by means of tilting.

2. Background Discussion of Prior Art

There is often a need to measure and dispense a preselectable quantity of fluid from a standard storage container such as a jar made of glass or plastic. The fluid might be either a liquid such as vinegar, detergent, or medicine, or a flowable granular material such as sugar, spice, grain, or soap.

The prior art describes a variety of devices that store, measure and dispense fluid. Each device generally is constructed to have a container with a storage reservoir area, a measuring chamber, a conduit connecting the reservoir area to the measuring chamber, and a spout that guides measured fluid out from the measuring chamber to a desired location. The fluid is measured by manipulating the device either by tilting the container, opening a valve, squeezing the flexible container walls, or a combination thereof so that some volume of fluid is moved from the storage reservoir area to the measuring chamber. The fluid in the measuring chamber is then dispensed out the spout by squeezing or tilting the container and/or opening a cap or a valve. These devices of prior art are inconvenient in that they either dispense only a single fixed volume of fluid, they require visual attention and dexterity to manipulate the device, they measure the volume inaccurately, or they are intended for use only with liquid or with granular fluids but not both.

The dispensing container device in U.S. Pat. No. 3,235,143 to Goodrich, Feb. 15, 1966 has an internal measuring chamber (26) which is open at its top. The measuring chamber (26) is filled with fluid when the device is tilted back. An internal shelf (18) directs fluid from the measuring chamber (26) out through a spout (16) when the device is subsequently tilted forward. Although this device is adequate for repeatedly measuring and dispensing a certain fixed volume of fluid, it is inconvenient in that it can not dispense an adjustable or selectable volume of fluid.

Two devices in U.S. Pat. Nos. 2,800,257 to Nixon, Jul. 23, 1957 and 3,029,002 to Gregoire, Apr. 10, 1962 provide measuring chambers of adjustable volumes and thereby the improvement of selectability of a desired volume of fluid to be dispensed. However, they are intended to be used only to dispense granular fluids and are not intended for use with liquids.

Nixon's dispenser, incorporated by reference herein, has a vertical cylindrical measuring chamber (2) that attaches by a friction fit to the top of a standard can in which coffee is purchased. The dispensed volume is preselected by adjusting the elevation of the ceiling (3) of the measuring chamber (2). When the device is inverted, coffee flows by gravity from the can into the measuring chamber (2). As the device is then returned to a vertical orientation, it is intended that the measured fluid residing in the measuring chamber (2) falls out a notch (12) on the side of the measuring chamber (2). The utility of this device is diminished because the volume of fluid that is dispensed is unpredictable. Excess fluid can spill from the measuring chamber (2) out the notch (12) as the device is tilted forward into the measuring position and more excess fluid can spill from the coffee can into the measuring chamber (2) and out the notch (12) as the device is tilted back from the measuring position to the dispensing position.

Gregoire's dispenser improves on Nixon's by measuring an accurate volume of fluid but is not intended to dispense liquids. Gregoire's dispenser is also awkward to use because it requires considerable dexterity and attention to operate. The dispenser attaches by threaded connection to the mouth of a standard jar. It has a horizontal cylindrical measuring chamber (20) whose volume can be pre-adjusted by moving a stick (19) to partially fill the measuring chamber (20). The dispenser is operated by inverting the device and holding it thus while rotating the measuring chamber (20) about its axis. When the measuring chamber (20) is positioned so that its opening communicates with the interior of the jar, fluid fills and covers the measuring chamber. The fluid residing in the measuring chamber is then dispensed by maintaining the device in the inverted position and rotating the measuring chamber (20) so that it communicates with the exterior of the container, at which time fluid residing in the measuring chamber (20) falls out and is dispensed. This device is inconvenient because two hands must be used to operate the device, one hand for inverting and holding the container while the other hand adjusts the measured volume and then twists the measuring chamber (20) to measure and dispense.

OBJECTS AND ADVANTAGES

Accordingly, several objects and advantages of the present invention are:

- to provide an improved fluid dispenser.
- to provide a convenient dispenser that can be used to repeatedly dispense accurately measured volumes of either liquid or granular fluid material.
- to provide a dispenser that can be securely attached to a standard storage container in which the fluid was purchased.
- to provide a dispenser for which a consistent volume of fluid to be measured and dispensed can be easily and conveniently selected prior to operation.
- to provide a dispenser that can be used to repeatably dispense a consistent volume of fluid until adjustment is made to select a new desired volume.
- to provide a dispenser in which the volume of fluid to be measured and dispensed is easily and conveniently selected by rotating a knob that is located on the top of the container.
- to provide a dispenser with raised volume indicators on a knob that provide visual and tactual cues that can be seen and/or felt to determine the measuring volume of the dispenser.
- to provide a dispenser that has graduated marks on the side and an index mark on a moveable floor that can be viewed to provide an additional feedback cue to confirm that the desired volume has been selected.
- to provide a dispenser that can be operated quickly and easily with only one hand.
- to provide a dispenser with a breather tube that will maintain atmospheric pressure within the container allowing free flow of dispensed liquid.
- to provide a dispenser that has a cover which, in the closed position, will prevent material from entering or exiting the container.

to provide a dispenser that can be used to distributively sprinkle fluid as it is dispensed.

Further objects and advantages of my invention will become apparent from a consideration of the drawings and ensuing description.

DRAWING FIGURES

DESCRIPTION OF INVENTION

Figure 1:
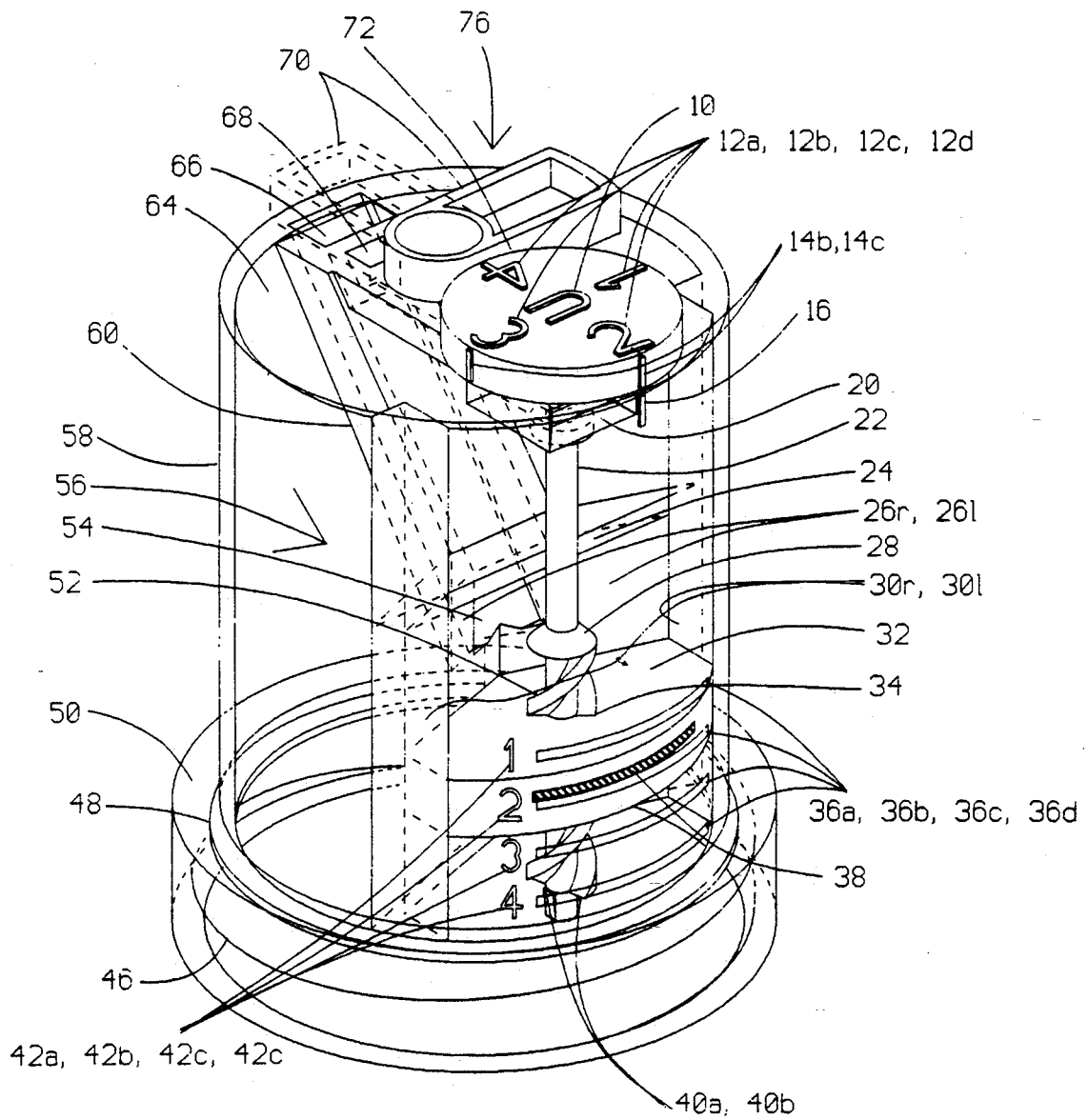
FIG. 1 is an isometric view of the dispenser of the invention in its normal or storage position.
Figure 2:
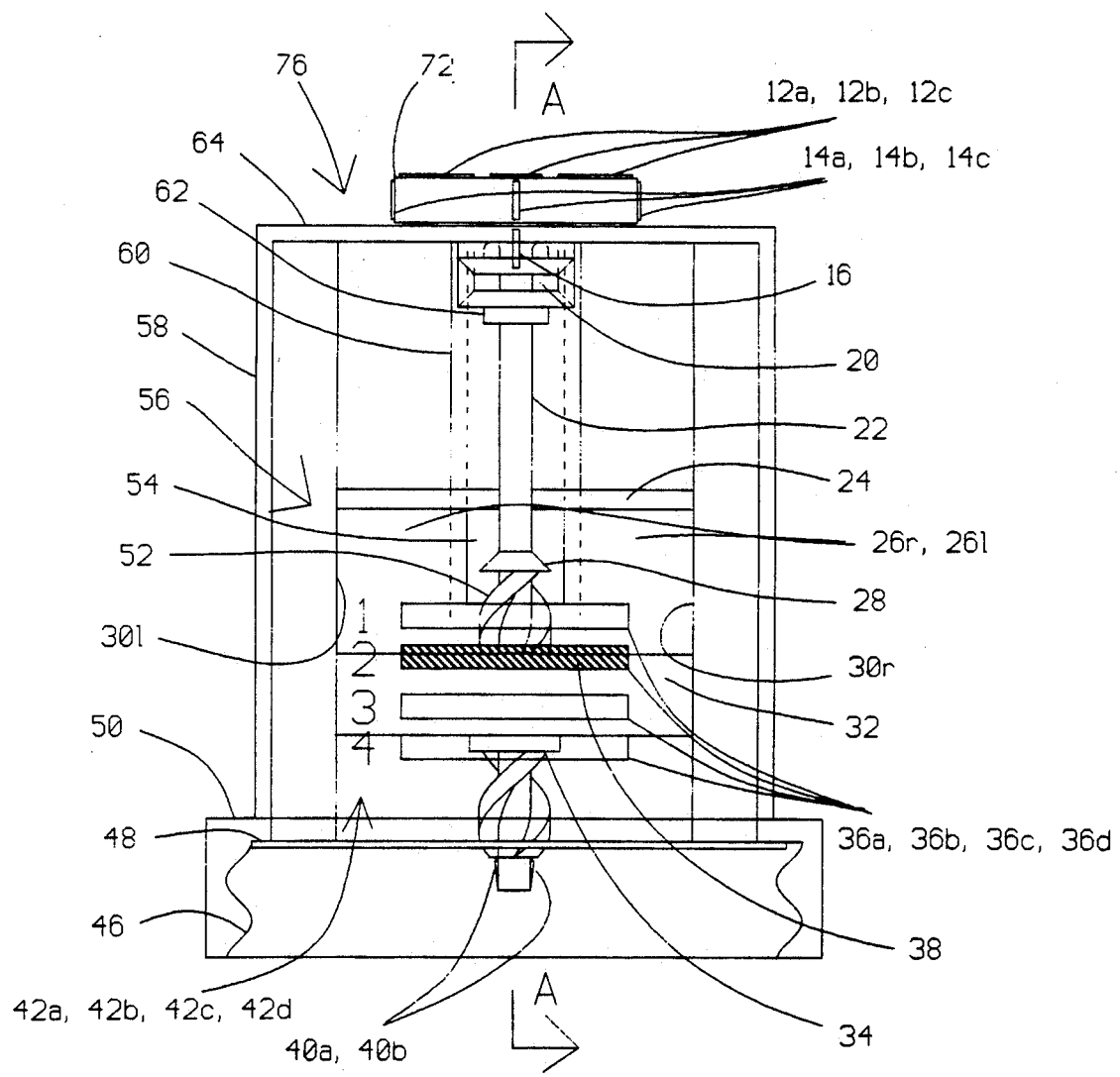
FIG. 2 is a pictorial representation of the dispenser as viewed from the back side.
Figure 3:
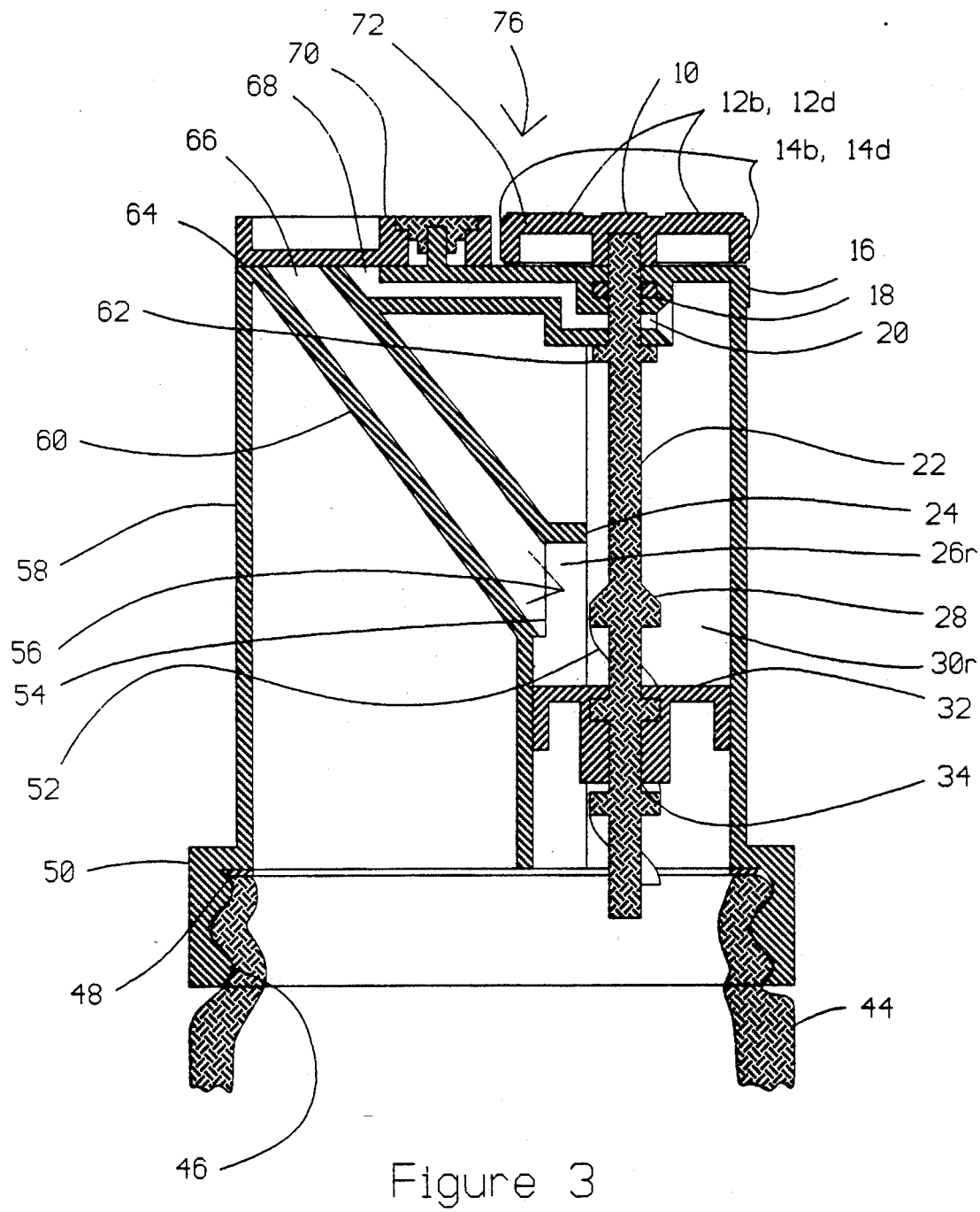
FIG. 3 is a cross-sectional view of the dispenser through section A—A of FIG. 2 so that the front side of the dispenser is shown to the left of the page.

A typical embodiment of the dispenser, shown generally at 76, of the present invention is illustrated in FIGS. 1, 2, and 3. Fluid dispenser 76 is molded of transparent or translucent glass or plastic material in the form of a tubular vertical body wall 58 which is closed above by a horizontal top plate 64 and has a cylindrical open base 50 that threadably attaches to the mouth of a jar 44. Jar 44 serves as the storage reservoir of the device and may be the container in which the fluid was purchased. Features of fluid dispenser 76 include a volume selection knob 72 and a cover 70, which are located upon top 64, and a fluid dispensing chute 60, an air breather channel 20, a partially threaded rotatable shaft 22, and an adjustable-volume measuring chamber 56, which are located within the interior of body wall 58. There are markings on the top and sides of knob 72 and on the back side of body wall 58.

Knob 72 is horizontally and rotatably situated on top 64 so that its back edge is positioned directly above the external back edge of body wall 58. Shaft 22 is attached to knob 72 and extends downwardly through a small hole in dispenser top 64, into the interior of fluid dispenser 76, and through a threaded hole 34 in a vertically moveable panel or floor 32 of measuring chamber 56. A gasket 18 encircles shaft 22 near its top and is enclosed in a recess formed in top 64. Shaft 22 has an enlargement or ridge 62 positioned below top 64 that prevents shaft 22 from moving upwardly. Knob 72 prevents shaft 22 from moving downwardly. Shaft 22 has a conic shaped stop or flange 28 near its midpoint and threads 52 that extend below flange 28. Threads 52 engage with the internal threads of threaded hole 34. Latches 40$a$ and 40$b$ are joined to either side of shaft 22 at its lower end.

Adjustable-volume measuring chamber 56 is located within the dispenser interior on the back edge of body wall 58 at approximately mid-height of the dispenser. Measuring chamber 56 is formed by four rectangular panels or walls 26$r$, 26$l$, 30$r$, and 30$l$, a portion of body wall 58, a partial ceiling 24, and floor 32. Floor 32 is formed to fit snugly within the area defined by walls 26$r$, 26$l$, 30$r$, 30$l$, and 58. Side walls 30$r$ and 30$l$ are mutually parallel and extend from body wall 58 into the interior of the dispenser and from the dispenser top 64 down below floor 32. Angled walls 26$r$ and 26$l$ are joined to the inner edges of side walls 30$r$ and 30$l$, respectively, and are joined to each other at an angle near the center of the dispenser. Partial ceiling 24 is joined to the top edges of angled walls 26$r$ and 26$l$ The interior of measuring chamber 56 communicates with the interior of the dispenser through a gap between partial ceiling 24 and body wall 58. A small rectangular notch is removed from the top center area of each angled wall 26$r$ and 26$l$. In combination, these two notched areas form a generally rectangular chute inlet 54 in the front side of measuring chamber 56.

Chute 60 extends diagonally from chute inlet 54 to a chute outlet 66 formed in dispenser top 64. Chute 60 has a rectangular cross section that gradually reduces in size from chute inlet 54 to chute outlet 66. A breather inlet 68 is located near chute outlet 66. Breather channel 20 is a tubular cavity that is molded as part of dispenser top 64 and extends first downwardly and then backwardly from breather inlet 68, below dispenser top 64, to communicate with the interior of dispenser 76 above measuring chamber 56. Cover 70 is pivotally attached to dispenser top 64 near the axis of the dispenser. When cover 70 is pivoted to either side of center it is in the open position, exposing chute outlet 66 and breather inlet 68. In an alternate embodiment shown in FIG. 4, cover 70' is enlarged and has small holes 74' that can be moved over chute outlet 66 to sprinkle fluid as it is dispensed.

Again referring to FIGS. 1, 2, and 3, cylindrical base 50 is enlarged, coaxially with body wall 58, to fit over the mouth of jar 44. Base 50 has internal threads 46 that match the external threads of jar 44. A gasket 48 is located inside base 50 and above threads 46. When the dispenser body is threaded onto jar 44 with sufficient torque, gasket 48 is compressed, forming a leak-proof seal between jar 44 and the dispenser.

Markings for use in determination of the measuring and dispensing volume are provided in two areas: 1) There are raised markings on volume selection knob 72 and on the back of body wall 58 at the top; 2) There are scribed, molded, or painted markings that are located on the back side of floor 32 and body wall 58 in the area of measuring chamber 56.

A multiplicity of raised marks 10, 12$a$, 12$b$, 12$c$, 12$d$, 14$a$, 14$b$, 14$c$, and 14$d$ are formed on knob 72. Raised unit mark 10 is a symbol that represents the units of volumetric measurement indicated by volume indicator marks 12$a$, 12$b$, 12$c$, and 12$d$. Mark 12$a$, 12$b$, 12$c$, or 12$d$ provides a visual cue that indicates the number of units of fluid volume to be measured when it is positioned over a raised index mark 16 which is located at the back top of dispenser body wall 58. Alignment marks 14$a$, 14$b$, 14$c$, and 14$d$ aid in accurately aligning marks 12$a$, 12$b$, 12$c$, and 12$d$ with index mark 16.

Visible through transparent body wall 58 is an index mark 38 which is located on the back side of floor 32. When floor 32 is vertically positioned so that index mark 38 is aligned with one of a multiplicity of graduated alignment marks 36a, 36b, 36c, or 36d, located on body wall 58, the associated volume indicator mark 42a, 42b, 42c, or 42d provides a visual cue as to how much volume is defined by walls 26 and 30, floor 32, and ceiling 24 of measuring chamber 56. Unit mark 10 represents the units of volumetric measurement indicated by volume indicator marks 42a, 42b, 42c, and 42d.

Operation - FIGS. 1, 2, 3, 5, 6, and 7

Figure 5:
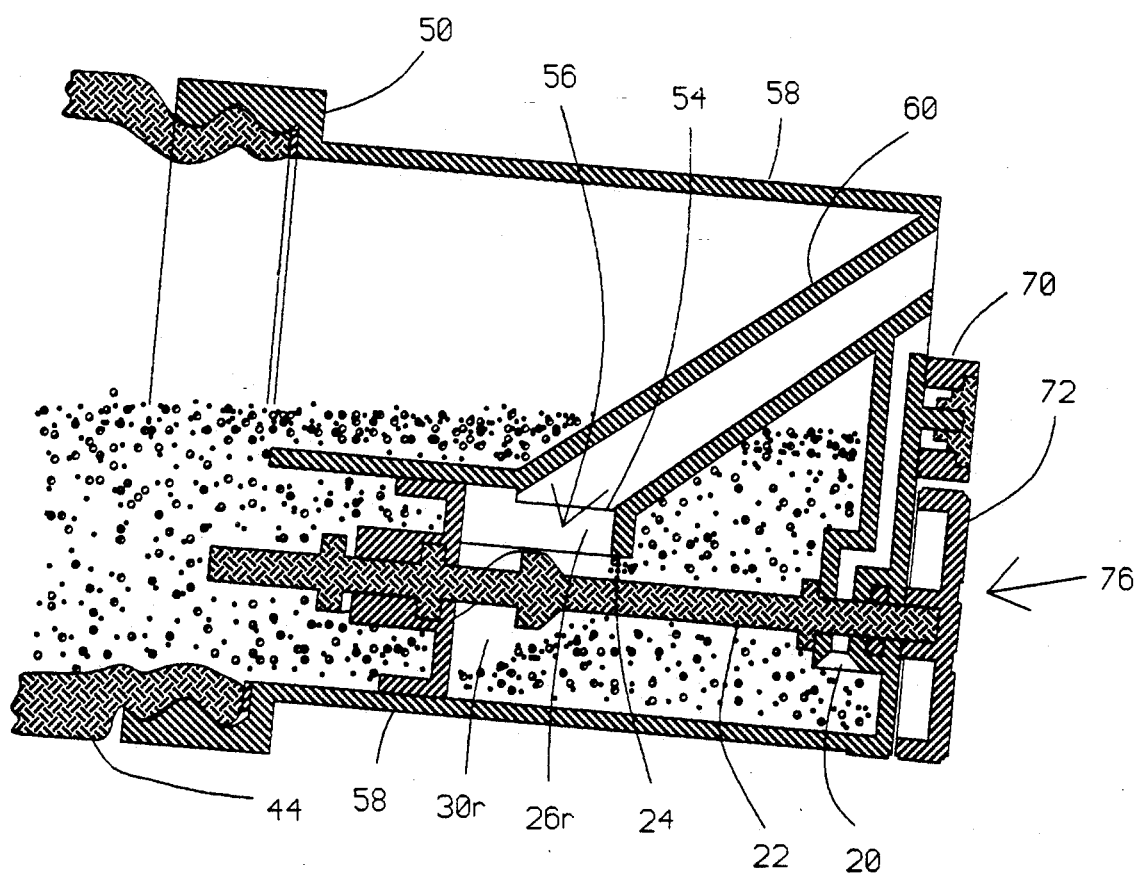
FIG. 5 is a cross-sectional view through section A—A of FIG. 2 of the dispenser shown in the filling position. Fluid is covering and partially filling the measuring chamber.
Figure 6:
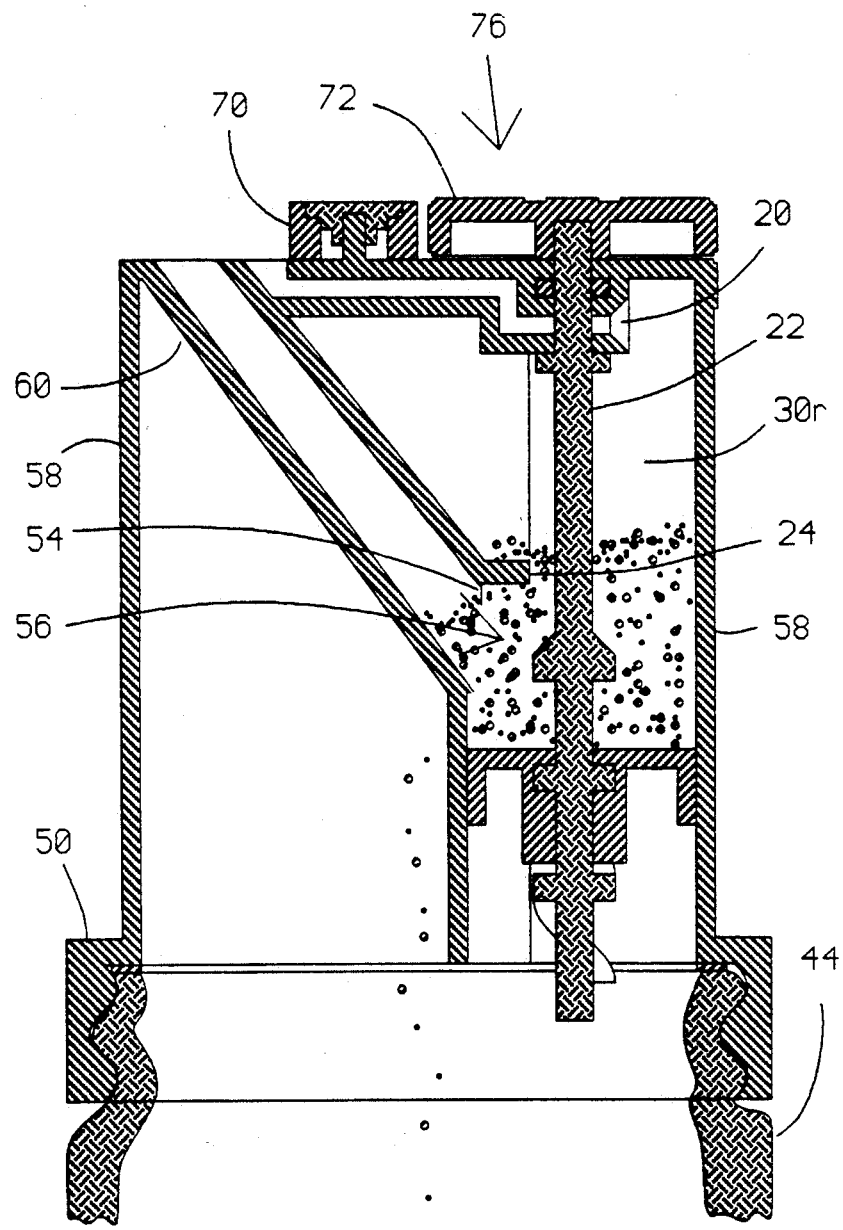
FIG. 6 is a cross-sectional view through section A—A of FIG. 2 of the dispenser shown in the measuring position. The measuring chamber is completely filled with fluid and excess fluid is returning to the storage reservoir area in the jar.
Figure 7:
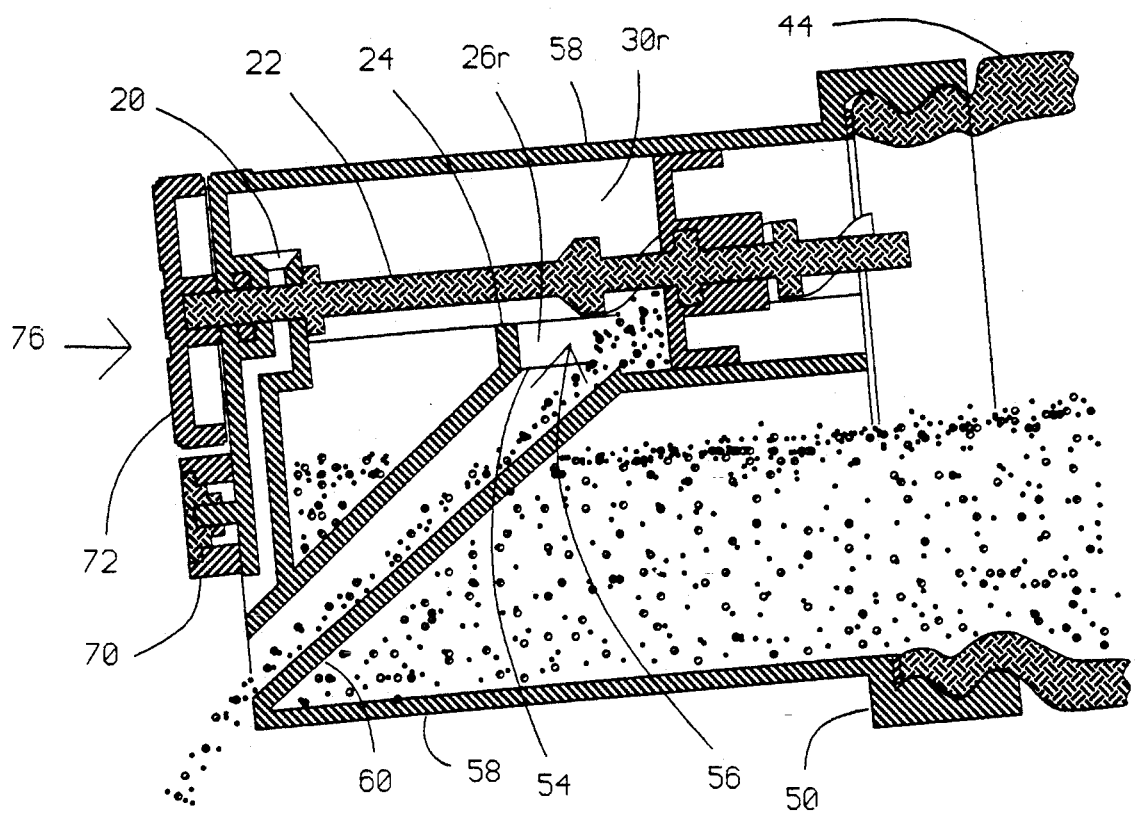
FIG. 7 is a cross-sectional view through section A—A of FIG. 2 of the dispenser shown in the dispensing position. Measured fluid is flowing out of the measuring chamber through the chute to the dispensed location.

In preparation for operation, and referring to FIGS. 1, 2, and 3, cover 70 is moved to the open position by pivoting it to either side of center and, if necessary, a new measuring volume is selected by rotating knob 72. As knob 72 is rotated, shaft 22 to which it is connected also rotates. Threads 52 of rotating shaft 22 react with internal threads of hole 34 to force floor 32 up or down. As floor 32 is moved up or down the volume of measuring chamber 56 is decreased or increased. Vertical movement of floor 32 is limited above by shaft flange 28 and below by shaft latches 40a and 40b. The selected volume of measuring chamber 56 determines the volume of fluid to be dispensed. As knob 72 is rotated, indicator mark 12a, 12b, 12c, or 12d can be positioned over index mark 16 and, in combination with unit mark 10, will indicate the corresponding measurement volume defined by the interior space of measuring chamber 56. Vision is not required to adjust the volume to be measured; one can align the appropriate raised marks 12a, 12b, 12c, or 12d, and 14a, 14b, 14c, or 14d on the volume control knob 72 with raised mark 16 on dispensing body 58 by feel and thus be assured that dispenser 76 has been prepared to dispense the desired fluid volume. Additionally, one can visually determine or confirm that the desired volume has been selected by observing, at the back of body wall 58, that volume index mark 38 is aligned with volume graduation mark 36a, 36b, 36c, or 36d corresponding to the Fluid dispenser 76 can then be operated by tilting it first backwards to the filling position, then returning it to an approximately vertical measuring position, and finally tilting it forwards to the dispensing position. When dispenser 76 is tilted to the filling position, as shown in FIG. 5, fluid flows from jar 44 to cover measuring chamber 56. Some of the fluid flows through the gap between partial ceiling 24 and body wall 58 and into measuring chamber 56. As dispenser 76 is tilted to the measuring position, as shown in FIG. 6, the fluid covering measuring chamber 56 flows to completely fill measuring chamber 56 while the fluid in excess of the measuring chamber volume spills over partial ceiling 24 and back to the reservoir area in jar 44. As dispenser 76 is then tilted to the dispensing position, as shown in FIG. 7, fluid residing in measuring chamber 56 is guided by walls 26r and 26l, and ceiling 24 to flow into chute inlet 54, through chute 60, and out to the dispensed location. Partial ceiling 24 prevents the measured fluid from spilling out of measuring chamber 56 and returning to the reservoir area while the dispenser is in the dispensing position. As fluid evacuates dispenser 76, air flows in by way of breather channel 20 to equalize the pressure within dispenser 76 with external atmospheric pressure thereby preventing an air-lock condition. In the dispensing position, the relative location of walls 30r and 30l, partial ceiling 24, chute inlet 54, and breather channel 20 prevent unmeasured fluid stored in the dispenser from entering measuring chamber 56 and draining out by way of chute 60 or breather channel 20.

Dispenser 76 can be repeatedly operated in this fashion, dispensing the same volume of fluid with each use until a different volume is selected by rotating knob 72. After operation, cover 70 is pivoted to the center or closed position to prevent contaminants from entering and to prevent fluid contents from spilling out should it be inadvertently upended.

Conclusions, Ramifications, and Scope

Thus, the liquid and granular fluid dispenser of this invention can be prepared to dispense a pre-selectable volume of fluid easily and conveniently by turning a knob on the top of the dispenser; can indicate, visually and tactually by the angular position of its volume control knob, the fluid volume to be measured; can be used to repeatably dispense a consistent volume of fluid on each operation until a new volume is selected; can be operated without attention as to how much fluid has filled the measuring chamber; and it can be operated using only one hand. Furthermore, the dispenser has the additional advantages in that it can be used to repeatedly dispense accurately measured volumes of either liquid or granular fluid material.

it can be securely attached to a standard storage container in which the fluid was purchased.

it can be used to select a consistent volume of fluid to be measured and dispensed easily and conveniently prior to operation.

its measuring volume can be determined visually by viewing the relative positions of the graduations marked on the side of the dispenser and an index mark on the moveable floor.

it will allow free-flow of measured liquid and avoid an air-lock condition by allowing internal air pressure to equalize with external atmospheric pressure through a breather tube.

it will prevent material from entering or exiting the interior when the cover is in the closed position.

it can be used to distributively sprinkle fluid as it is dispensed.

Figure 4:
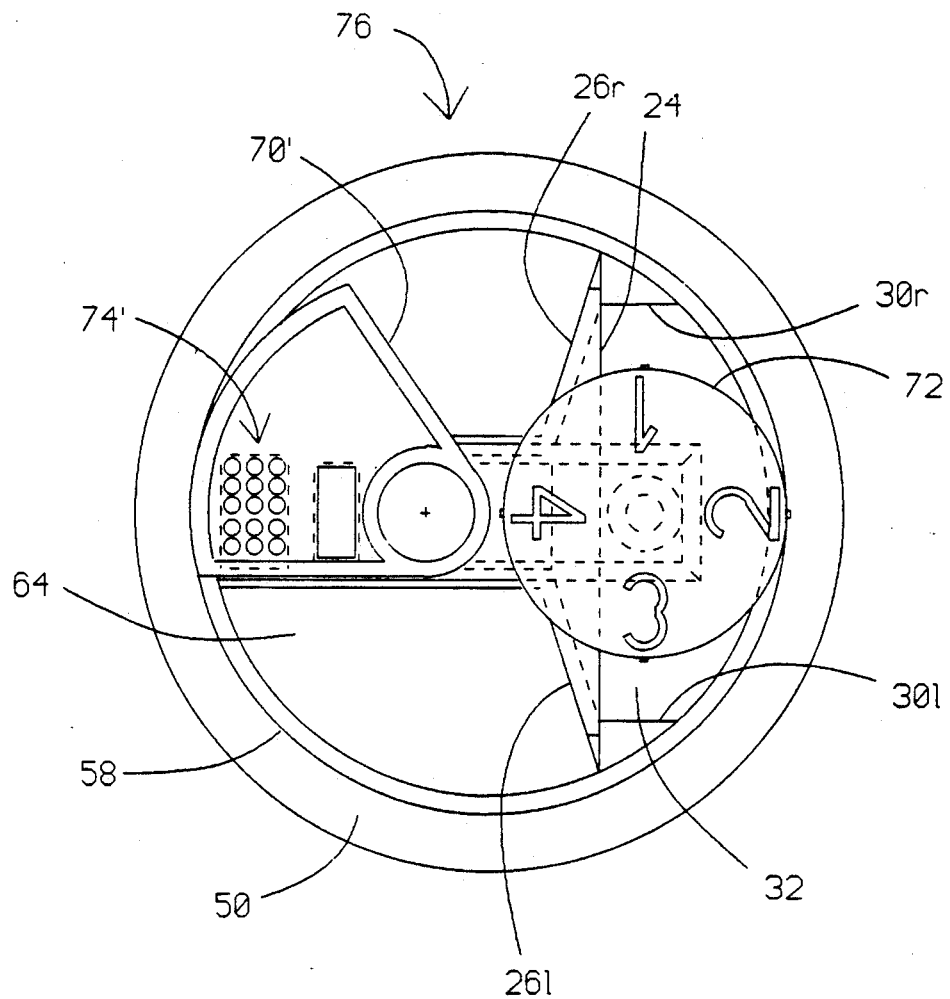
FIG. 4 is a top view of the dispenser showing an alternate cover that can sprinkle fluid as it is dispensed.
Figure 8:
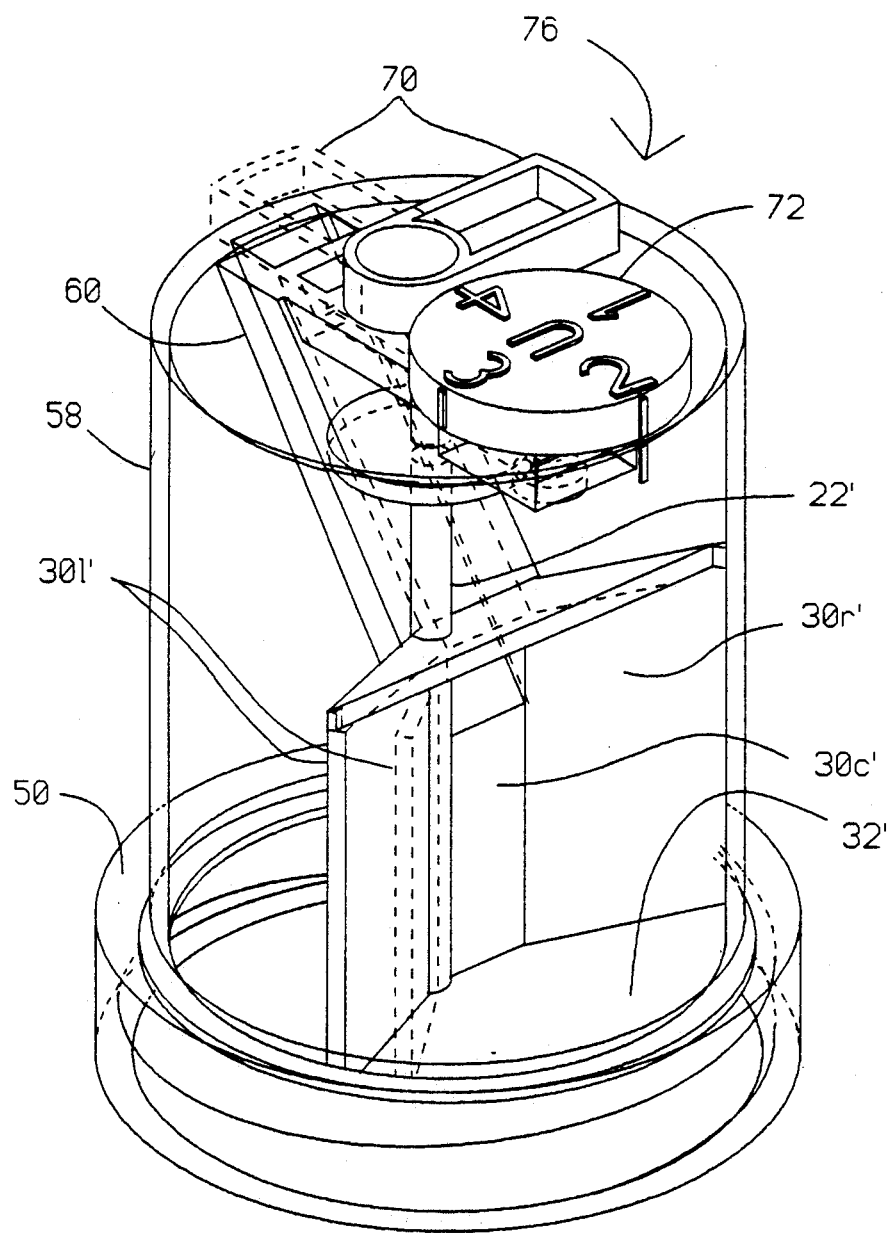
FIG. 8 is an orthagonal view of an alternate embodiment of the dispenser showing a measuring chamber whose volume is changed by moving a wall.

Although the description above contains many specificities, these should not be construed as limiting the scope of the invention but they are offered to easily obtain illustrations of some of the presently preferred embodiments of this invention. For example, cover 70' could be modified to sprinkle fluid as it is dispensed as shown in FIG. 4 and/or the moveable member that changes the volume of the measuring chamber could be a wall 30l' as shown in FIG. 8, as opposed to moving floor 32, as shown in FIGS. 1, 2, and 3. The position of moving wall 30l' could be changed by pivoting it about a rotated shaft 22'. The rotational motion of the shaft is provided by conventional transmission from manually rotated volume control knob 72. The other measuring chamber walls 30c' and 30r' and floor 32' may remain stationary. Base 50 may be a separate, threaded collar piece that attaches a flange at the base of body wall 58 to container 44.

Thus the scope of the invention should be determined by the appended claims and their legal equivalents, rather than by the examples given and embodiments illustrated.

What is claimed is:

1. A device for measuring and dispensing pre-selectable volumes of fluid material form a container, comprising:

a) a base portion having means for securely engaging and sealing to a container,
b) a tubular housing extending vertically from said base portion and having a back edge,
c) a horizontal top plate joined at its perimeter to said tubular housing,
d) a chamber means disposed within the interior and towards the back edge of said tubular housing,
e) the interior of said tubular housing communicating with the interior of said chamber through an aperture in the top of said measuring chamber,
f) a pivotal positioning means that affects the volumetric dimensions of said chamber means by pivoting a panel of said chamber about and axis that is parallel to said panel,
g) a chute means with an external aperture for conveying the contents of said measuring chamber to a dispensing location when device is properly operated by tilting.

2. The dispenser of claim 1 further comprising
h) a breather means with an external aperture for maintaining atmospheric pressure within said dispenser when it is in use.

3. The dispenser of claim 1 further comprising
h') a closing means for sealing said external apertures of said dispenser from the outside environment.

4. The dispenser of claim 1 further comprising
h'') a sprinkling means for distributively dispensing fluid material.

5. A device for measuring and dispensing pre-selectable volumes of fluid material from a container, comprising:
a) a base portion having means for securely engaging and sealing to a container,
b) a tubular housing extending vertically from said base portion and having a back edge,
c) a horizontal top plate joined at its perimeter to said tubular housing,
d) a chamber means disposed within the interior and towards the back edge of said tubular housing,
e) the interior of said tubular housing communicating with the interior of said chamber through an aperture in the top of said chamber,
f) a chamber floor positioning means that displaces a vertically moveable floor panel of said chamber,
g) a chute means with an external aperture for conveying the contents of said chamber to a dispensed location when said device is forwardly tilted.

6. The dispenser of claim 5 further comprising
h) a breather means, with an external aperture and an internal aperture located above said chamber, for maintaining atmospheric pressure within said dispenser when it is in use.

7. The dispenser of claim 5 further comprising
h') a closing means for sealing said external apertures of said dispenser from the outside environment.

8. The dispenser of claim 7 further comprising
h'') a sprinkling means, incorporated into said closing means, for distributively dispensing fluid material.

* * * * *